US012138211B2

(12) United States Patent
Triggianese

(10) Patent No.: US 12,138,211 B2
(45) Date of Patent: Nov. 12, 2024

(54) DEVICE FOR TREATING CELLULITIS

(71) Applicant: FELDI S.R.L., Seriate (IT)

(72) Inventor: Doriano Triggianese, Bergamo (IT)

(73) Assignee: FELDI S.R.L., Seriate (IT)

( * ) Notice: Subject to any disclaimer, the term of this patent is extended or adjusted under 35 U.S.C. 154(b) by 319 days.

(21) Appl. No.: 17/778,541

(22) PCT Filed: Nov. 22, 2019

(86) PCT No.: PCT/IB2019/060061
§ 371 (c)(1),
(2) Date: May 20, 2022

(87) PCT Pub. No.: WO2021/099823
PCT Pub. Date: May 27, 2021

(65) Prior Publication Data

US 2022/0409477 A1 Dec. 29, 2022

(51) Int. Cl.
*A61H 15/00* (2006.01)
*A61H 7/00* (2006.01)

(52) U.S. Cl.
CPC ......... *A61H 15/0092* (2013.01); *A61H 7/003* (2013.01); *A61H 2015/0021* (2013.01); *A61H 2201/0157* (2013.01); *A61H 2201/1253* (2013.01); *A61H 2201/1635* (2013.01); *A61H 2201/1671* (2013.01); *A61H 2201/1676* (2013.01); *A61H 2207/00* (2013.01)

(58) Field of Classification Search
CPC ................ A61H 15/00; A61H 15/0092; A61H 15/0085; A61H 2015/0021; A61H 2015/0007; A61H 7/003; A61H 2201/0157; A61H 2201/1253; A61H 2201/1695
USPC ................................................ D24/211, 214
See application file for complete search history.

(56) References Cited

U.S. PATENT DOCUMENTS

| | | | | |
|---|---|---|---|---|
| 3,583,396 A * | 6/1971 | Landis | A61H 15/0092 | 601/125 |
| 3,814,085 A | 6/1974 | Kupchinski | | |
| 2011/0087141 A1* | 4/2011 | Wagy | A61H 15/0085 | 601/137 |

(Continued)

FOREIGN PATENT DOCUMENTS

| | | |
|---|---|---|
| FR | 618121 A | 3/1927 |
| JP | 2019097606 A * | 6/2019 |
| WO | 2010019190 A2 | 2/2010 |

OTHER PUBLICATIONS

International Search Report and Written Opinion Received for the PCT Application No. PCT/IB2019/060061 mailed on Aug. 20, 2020, 12 pages.

*Primary Examiner* — Colin W Stuart
*Assistant Examiner* — Douglas Y Sul
(74) *Attorney, Agent, or Firm* — Amster, Rothstein & Ebenstein LLP

(57) ABSTRACT

A massage device comprising at least one arcuate support provided with a plurality of adjacent rollers, wherein each roller is constrained to the arcuate support in a certain position and is further adapted to rotate about an axis belonging to a plane substantially parallel to the tangential plane to the profile of the arcuate support at said certain position, and each roller of said plurality of rollers is convergent or divergent with respect to the immediately adjacent roller.

18 Claims, 6 Drawing Sheets

(56) References Cited

U.S. PATENT DOCUMENTS

| | | | | |
|---|---|---|---|---|
| 2013/0289454 | A1 * | 10/2013 | Wang | A61H 15/00<br>601/132 |
| 2016/0136033 | A1 * | 5/2016 | Johnston | A61H 15/0092<br>601/129 |
| 2020/0138666 | A1 * | 5/2020 | Piucci, Jr. | A61H 39/02 |
| 2020/0390642 | A1 * | 12/2020 | Kim | A61N 1/0456 |
| 2021/0145689 | A1 * | 5/2021 | Cheong | A61H 15/0085 |

* cited by examiner

DEVICE FOR TREATING CELLULITIS

CROSS REFERENCE TO RELATED APPLICATIONS

This application claims benefit under 35 U.S.C. § 371 to international application No. PCT/IB2019/060061 filed on Nov. 22, 2019, the content of which is incorporated by reference in its entirety.

FIELD OF THE INVENTION

The present invention relates to a device for treating cellulitis.

In particular, the present invention relates to a device which can be used by an operator or by the subject of the treatment to massage the body parts affected by the presence of cellulitis.

BACKGROUND ART

Cellulitis (edematofibrosclerotic panniculopathy) is a degenerative disorder of the subcutaneous adipose tissue (called panniculus adiposus) which occurs with visible hollows or holes on the skin which give a so-called "orange peel" appearance. If blood and lymphatic circulation do not work properly, the tissue fat cells go into distress and tend to break, pouring their content into the space between the cells and recalling an excess of water which ultimately causes the "orange peel" surface deformation of the cellulitis-affected skin.

Cellulitis-treating devices are known, which can be used by an operator or by the subject of the treatment to combat the imperfections caused by the presence of cellulitis.

A known type of such devices has a frame on which there are fitted rollers adapted to slide on the part to be treated by exerting a massaging effect.

Sometimes, the rollers have a shape provided with relief elements on their outer surface, said relief elements being adapted to come into contact with the part to be treated and to exert a certain appropriately localized pressure.

The rollers can be arranged in groups of juxtaposed rollers wherein the rotation axes of the rollers belonging to each group of rollers are oriented so that said rollers can cooperate in exerting the required pressure on the part to be treated.

For example, the rollers can be arranged on curved or bendable supports to exert a pressure substantially normal to the surface of the part on which they slide. These curved supports can be of different sizes or flexible and configurable to be adapted to the various body parts requiring treatment.

It is the object of the present invention to suggest a device for treating cellulitis which allows cellulitis to be treated more completely and effectively than similar devices of the prior art.

BRIEF DESCRIPTION OF THE INVENTION

Such an object is accomplished by a device for treating cellulitis having a plurality of massaging rollers configured to cooperate for exerting the required pressure on the part to be treated and to properly tighten the treated part with a "pinching" effect, very beneficial in combating cellulitis as it favors the expulsion of excess water retained in the tissue.

In a preferred embodiment, the massage device according to the present specification comprises one or two arcuate supports hinged at one end so that the concave profiles of said two supports face each other. Each of said supports comprises a plurality of adjacent rollers, each roller of said plurality of rollers is, in turn, constrained to one of said two supports in a determined position by, for example, two supports fixed to said support and adapted to accommodate the ends of the rotation axis of the corresponding roller. Each roller, therefore, is adapted to rotate about an axis belonging to a plane substantially parallel to the tangential plane to the support profile at the position in which the roller is located, moreover each roller of said plurality of rollers is arranged to be convergent or divergent with respect to the immediately adjacent roller. Thereby, the massaging rollers are configured to cooperate to exert the required pressure on the part to be treated and, moreover, to properly tighten the treated part with a "pinching" effect, very beneficial in favoring the expulsion of the excess water retained in the tissue, the ultimate cellulitis cause.

Therefore, the benefit of this embodiment, consists in that the rollers of the device work to lift, release and then stretch the skin of the part to be treated, with beneficial crushing effects of subcutaneous fat accumulations, expulsion of excess water, and stimulation of blood circulation.

In fact, practically, the rollers do not rotate parallel to the sliding direction of the device, but convergently or divergently rotate therebetween causing the skin to move in different and alternating manners.

For example, the rollers arranged with a convergent mutual inclination are such as to allow a massage tending to achieve a "pinching" pressure on the skin of the treated part, while the rollers belonging to some pairs of rollers of the device are arranged with a divergent mutual inclination and such as to allow a massage tending to stretch the skin of the treated part.

It is therefore possible to get at the same time both a massage compressing "pinching" the treated skin, and a massage stretching the treated skin, sliding the device on the part to be treated.

BRIEF DESCRIPTION OF THE DRAWINGS

Further features and advantages of the invention will become apparent from the reading of the following specification given as a non-limiting example, with the aid of the figures shown in the accompanying drawings, wherein.

The following description of exemplary embodiments refers to the accompanying drawings. The same reference numbers in different drawings identify the same or similar elements. The following detailed description does not limit the invention. The scope of the invention is defined by the appended claims.

DETAILED DESCRIPTION OF THE DRAWINGS

The massage devices used for treating cellulitis generally comprise a plurality of rollers fixed to a support and which are free to rotate about their own axis when the support is moved and pressed on the part to be treated.

In these devices, the rollers can be arranged in groups of juxtaposed rollers with the rotation axes of the rollers oriented so that said rollers can cooperate in exerting the required pressure on the part to be treated. The rollers are often anchored on curved or bendable supports to exert a pressure which is substantially normal to the surface of the part on which they slide. These curved supports can be of different sizes or flexible and configurable to be adapted to the various body parts requiring treatment. This sort of devices can exert only one type of pressure and are effective only in exerting one type of action and pressure on the part to be treated. The device according to the present specification allows obtaining the exertion of different types of pressure making the provided treatment more complete, effective, and beneficial.

Figure 1:
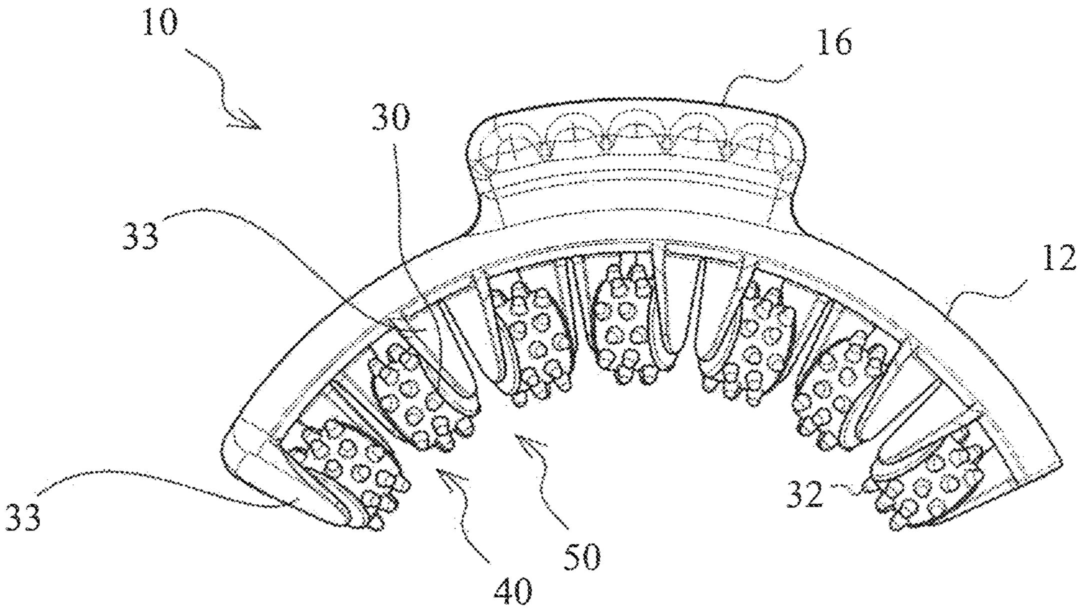
FIG. 1 shows a plan view of a device for treating cellulitis, according to an embodiment of the present invention.
Figure 2:
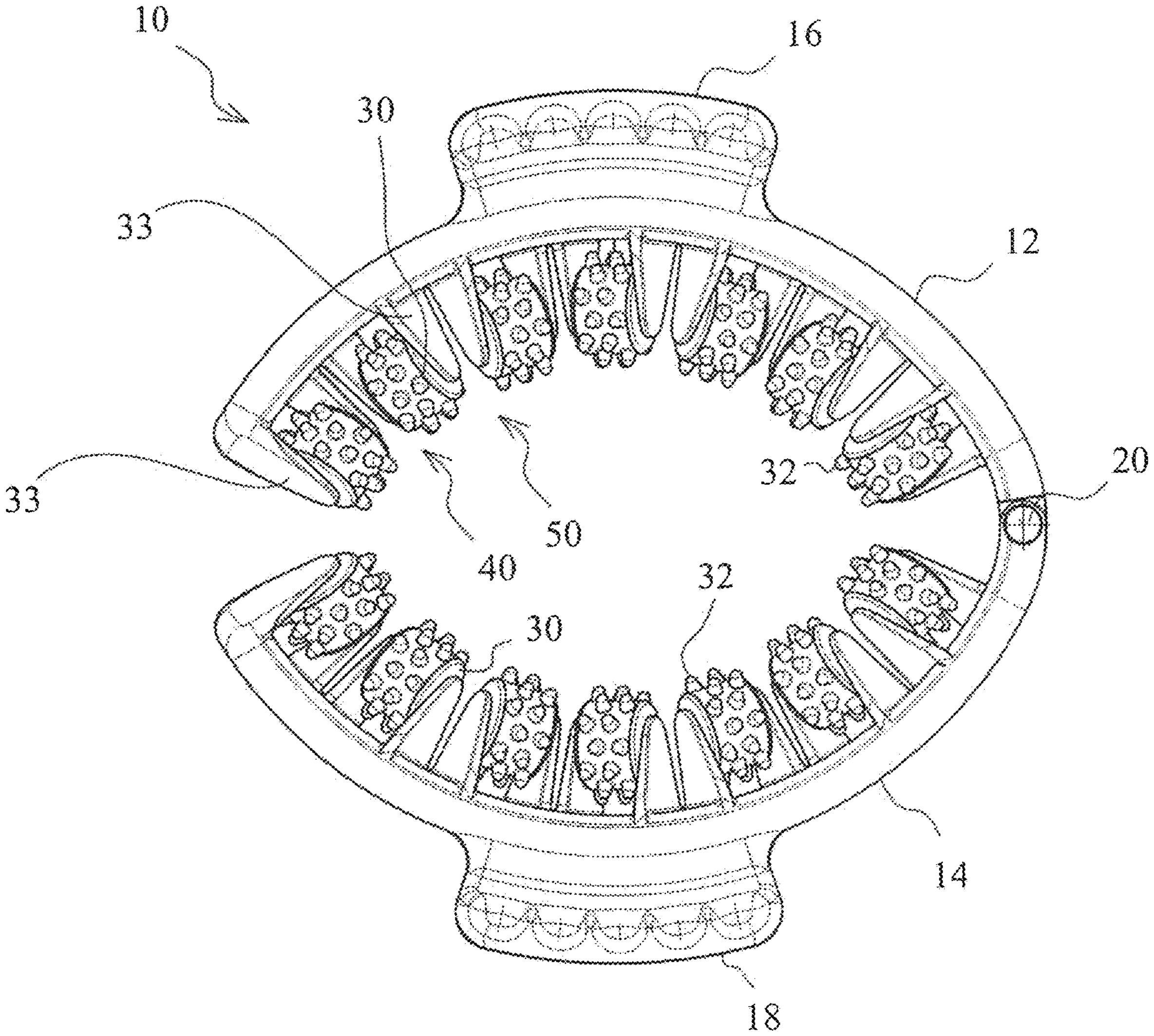
FIG. 2 shows a plan view of a device for treating cellulitis, according to another embodiment of the present invention.

The appended FIGS. 1 and 2 show plan views of a device for treating cellulitis, according to embodiments of the present invention, device globally indicated with the reference numeral 10.

The device 10 for treating cellulitis of the invention according to FIG. 2 has a frame on which rollers 30 are mounted adapted to slide on the skin to be treated. In this preferred embodiment the frame comprises two arcuate supports 12, 14 hinged at one end so that the concave profiles of said two supports face each other, in other embodiments of the present specification only one arcuate and moderately flexible support can be present in order to adapt to different anatomical parts to be treated.

Each of said supports 12, 14 comprises a plurality of adjacent rollers 30, each roller 30 of said plurality of rollers is in turn bound to one of said supports in a given position by, for example, two supports 33 fixed to said support and adapted to accommodate the ends of the rotation axis of the corresponding roller.

Each roller 30 is adapted to rotate about an axis belonging to a plane substantially parallel to the tangential plane to the support profile 12, 14 at the position wherein said roller is located, moreover, each roller 30 of said plurality of rollers is arranged so as to be convergent or divergent with respect to the immediately adjacent roller.

In the device 10 shown in FIG. 2, the frame is divided in two arcuate supports hinged to an end so that the concave profiles of said two supports face each other. The hinge 20 connecting the two supports 12, 14 allows the mutual approaching or detaching thereof and provides the possibility of adapting the device to the various anatomical parts to be treated, arms, legs, hips, glutes.

Advantageously, each of the supports 12, 14 has a handle 16, 18 allowing an easy and comfortable grip thereof.

Figure 3:
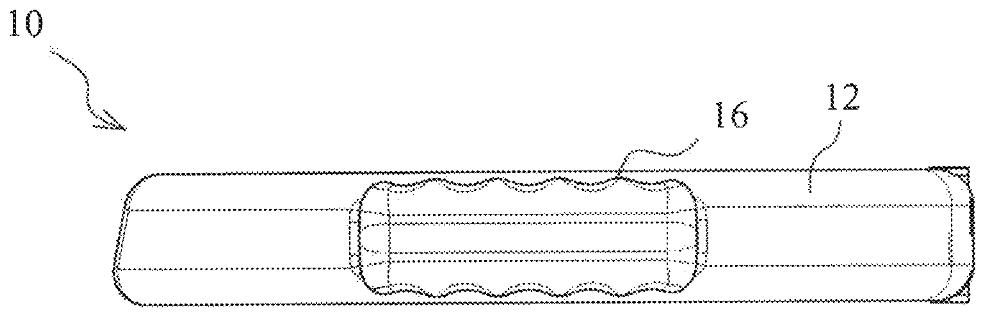
FIGS. 3, 4 and 5 depict a side view, a rear view and a front view of the device in FIG. 2, respectively.
Figure 4:
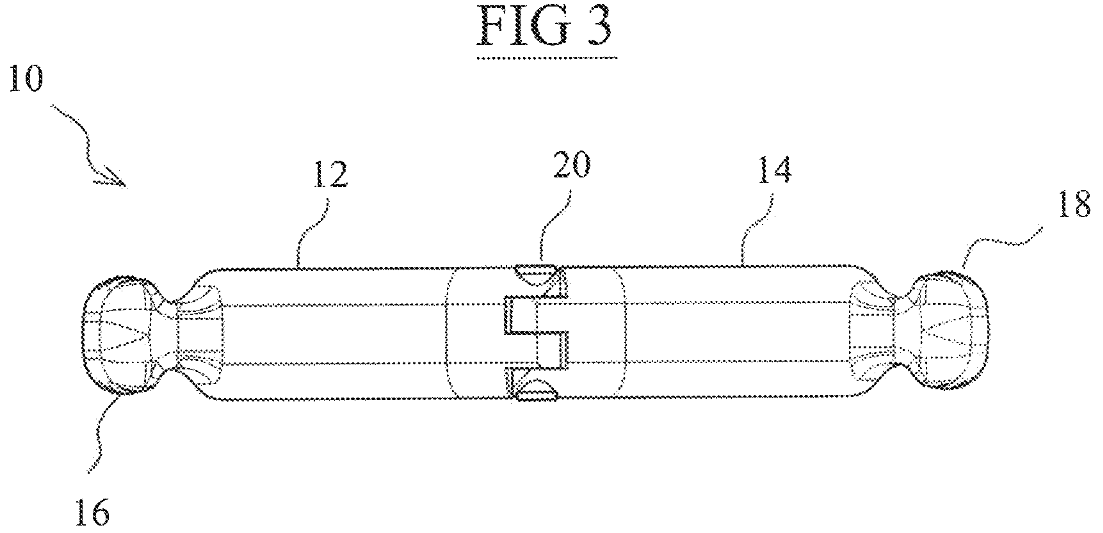
Figure 5:
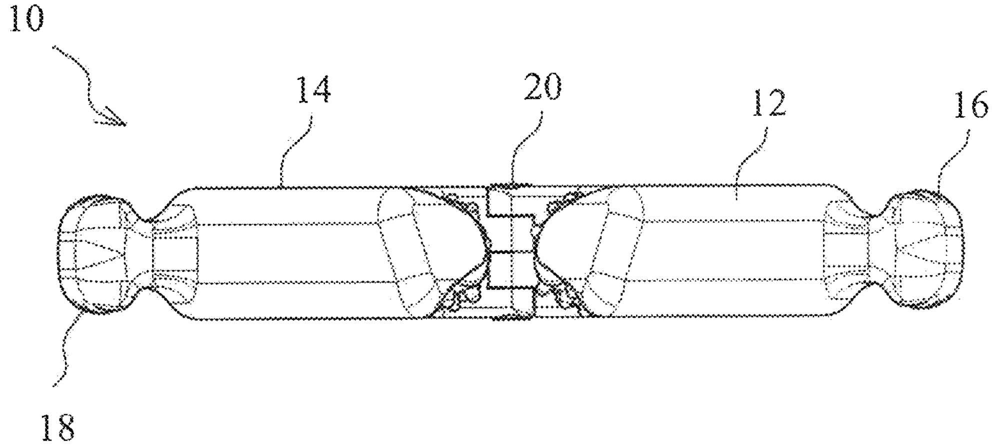
Figure 6:
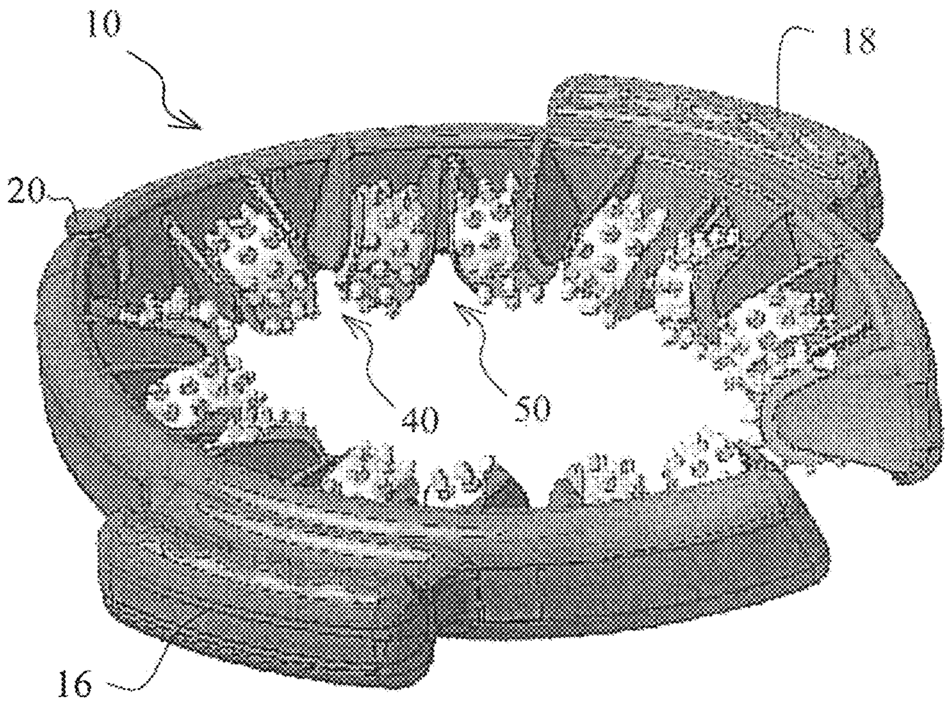
FIGS. 6 and 7 depict two different views of the device in FIG. 2.
Figure 7:
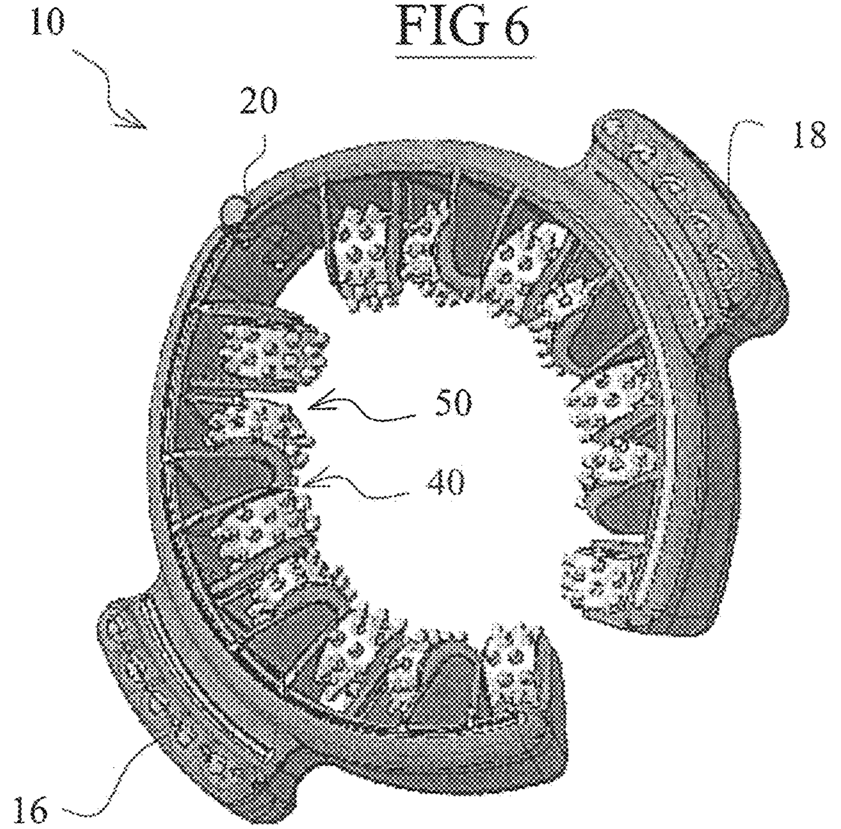

FIGS. 3, 4 and 5 depict a side view, a rear view and a front view of the device in FIG. 2, respectively, while FIGS. 5 and 6 depict two different axonometric views of the device in FIG. 2.

In the preferred embodiments shown in FIGS. 1-7, each of the aforesaid rollers 30 has a plurality of pins 32 on their outer surface. The pins can be made of materials of different hardness, according to the applications. Materials of common use for rollers 30 and pins 32 thereof can be made of plastic materials or natural or synthetic rubber or light metal materials. The supports 12, 14 can be made of plastic or light metal materials.

In the examples in FIGS. 1 and 2, each of the illustrated supports 12, 14 comprises 7 rollers and, during use, makes 6 combined actions on the part to be treated, of which three of compression and three of stretching.

Adding to these actions those actions caused by the rollers placed on the opposite half-frame, a total of 12 actions exerted by the device 10 is obtained.

The examples of the device according to the present specification shown in FIGS. 1 and 2 show that two convergent adjacent rollers, rotating with a certain pressure given by the user, start to engage with the skin of the part to be treated, by means of the rubber pins 32, when said rollers during their convergent rotation have the ends of their contact surfaces spaced from each other by about 2.5 cm. When the rollers 30 and the pins 32 thereof release the skin, the ends of their contact surfaces are spaced from each other by about 1 cm.

This process causes the displacement of the treated skin toward the conjunction of the rollers, creating a pinching or squeezing or kneading type massage.

Other couples of divergent adjacent rollers cause, instead, an effect contrary to the one described above i.e., they tend to extend and stretch the skin of the part to be treated because, when the rubber pins 32 placed on the surface of the rollers start to engage with the skin, the ends of their contact surfaces are spaced from each other by about 1 cm and, turning in a divergent direction, they drag the underlying skin therewith thus causing a traction or a stretching thereof until the release occurring at a distance between the ends of the contact surfaces of the rollers is of about 2.5 cm.

The greater the convergence or divergence between the adjacent rollers 30, the greater the pinching effect will be (or kneading or stretching effect); vice versa lower convergences or divergences will be less effective on the skin.

Further, the greater is the diameter of the rollers, the greater will be the effect of the kneading or stretching massage despite the constant angle between the bases of the two rollers.

Preferably, the diameter of the rollers 30 is within the range between 10 mm and 80 mm.

Obviously, the greater is the diameter of the rollers and less rollers will be possible to insert on a device resulting in a decrease in the number of simultaneous actions.

In a preferred embodiment, in the device 10, each of the supports 12, 14 has an arcuate shape.

The oval shape of the closed device 10 has been designed to easily massage both the part of the leg just above the knee, and the part reaching below the gluteus.

Due to the presence of the hinge 20, the device 10 can be used, open, also on the two glutes simultaneously.

Figure 8:
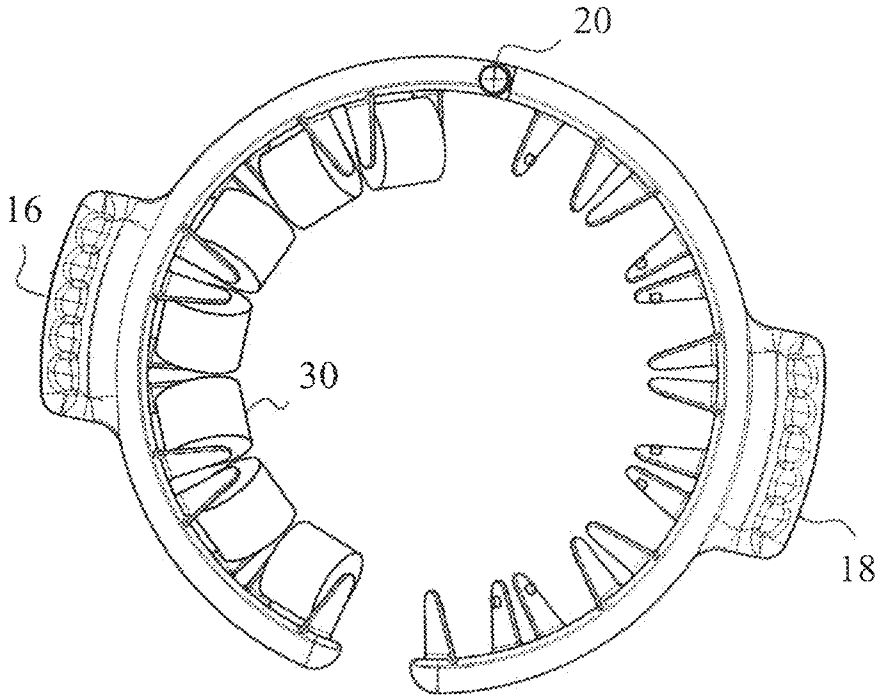
FIGS. 8 and 9 depict two further variants of the device according to the invention.
Figure 9:
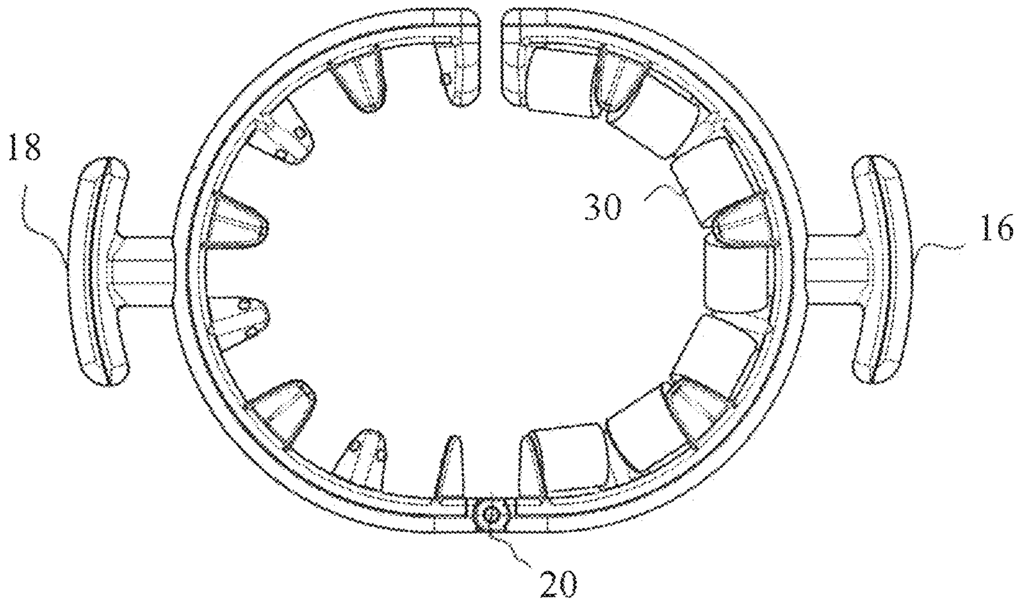

FIGS. 8 and 9 depict two further variants of the device according to the invention, differing from the variant of the FIGS. 1-5 also for the presence of the rollers 30 ‘ which are cylindrical and pin-free on their surface.

Figure 10:
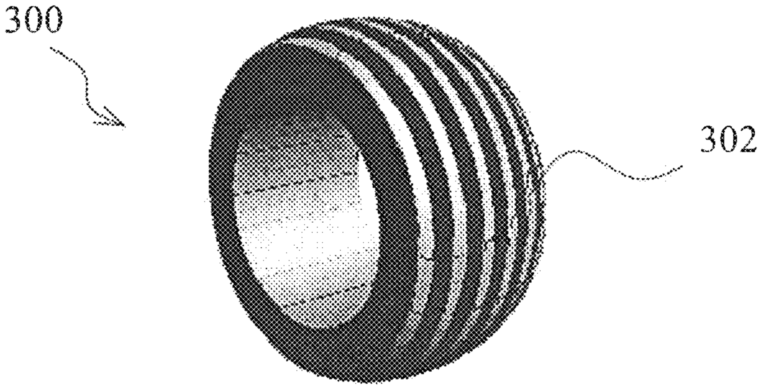
FIGS. 10-12 depict further different variants of the rollers which are applicable to the device according to the invention.
Figure 11:
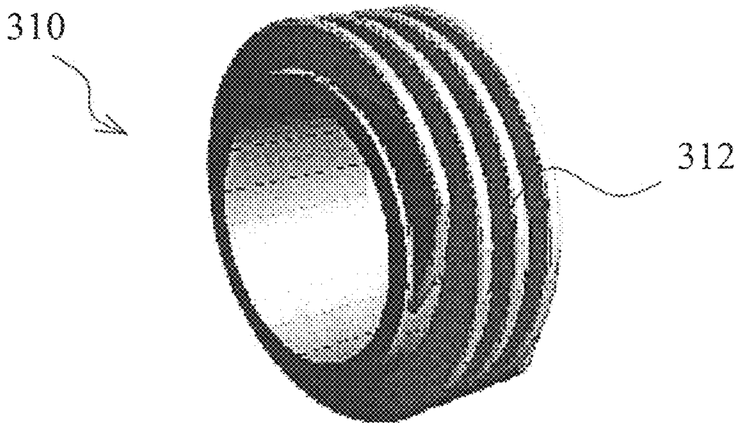
Figure 12:
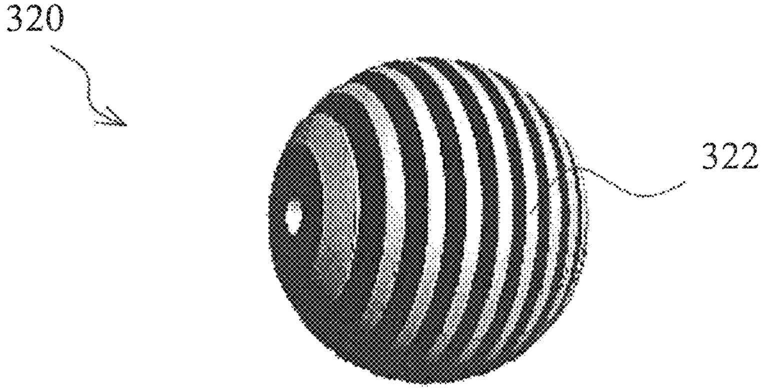

FIGS. 10-12 depict further different variants of the rollers which are applicable to the device according to the invention which present superficial grooves 302, 312, 322 instead the aforesaid pins 32, exerting a similar action than that of said pins 32.

These variants can be made by means of removable covers to be applied to smooth cylindrical rollers.

These variants can have almost cylindrical 312, almost ellipsoidal 302 or almost spherical 322 shapes.

Obviously, the invention as described may be subjected to modifications or improvements dictated by contingent or particular needs, without departing from the scope of the invention.

The invention claimed is:

1. A massage device comprising:

at least one arcuate support; and a first plurality of rollers, each roller of said first plurality of rollers being constrained along a concave surface of a first one of said at least one arcuate support and in a predetermined position that is aligned about a radial or transversal plane of the first arcuate support, each roller of the first plurality of rollers being rotatable about a rotational axis belonging to a plane substantially parallel to a tangential plane to a profile of the first arcuate support at said predetermined position, wherein the rotational axis of each roller of said first plurality of rollers is inclined with respect to the radial or transversal plane of said first arcuate support with an opposite inclination of the rotational axis of an adjacent roller.

2. The massage device according to claim 1, wherein said first arcuate support comprises a handle.

3. The massage device according to claim 1, wherein each roller of said first plurality of rollers comprises a plurality of pins made of a flexible material positioned on an outer surface thereof.

4. The massage device according to claim 3, wherein each roller of said first plurality of rollers and said plurality of pins are made of materials selected from the group comprising plastic materials, natural rubber, synthetic rubber, and metal materials.

5. The massage device according to claim 1, wherein each roller of said first plurality of rollers comprises a plurality of grooves formed on an outer surface thereof.

6. The massage device according to claim 1, wherein a diameter of each roller of said first plurality of rollers is between 10 mm and 80 mm.

7. The massage device according to claim 1, wherein said first arcuate supports is made of materials selected from the group comprising plastic materials and metal materials.

8. The massage device according to claim 1, wherein a pair of adjacent rollers on the first arcuate support have rotational axes which are positioned at a predetermined angle with respect to each other, such that skin and/or tissue being massaged is pinched therebetween the pair of adjacent rollers during movement of the massage device in a first direction.

9. The massage device according to claim 1, wherein a pair of adjacent rollers on the first arcuate support have rotational axes which are positioned at a predetermined angle with respect to each other, such that skin and/or tissue being massaged is stretched therebetween the pair of adjacent rollers during movement of the massage device in a first direction.

10. The massage device according to claim 1, wherein a pair of adjacent rollers on the first arcuate support have rotational axes which are positioned at a predetermined angle with respect to each other, such that skin and/or tissue being massaged is pinched therebetween the pair of adjacent rollers during movement of the massage device in a first direction, and such that the skin and/or tissue being massaged is stretched therebetween the pair of adjacent rollers during movement of the massage device in an opposing second direction.

11. The massage device according to claim 1, wherein the at least one arcuate support includes a second arcuate support having a second concave surface and is hinged to the first arcuate support, the first arcuate support and the second arcuate support being arranged such that the respective concavities of each of the first and second arcuate supports face each other.

12. The massage device according to claim 11, wherein the second arcuate support comprises a second plurality of rollers, each roller of said second plurality of rollers being constrained along the second concave surface of the second arcuate support in a predetermined position that is aligned about a radial or transversal plane of the second arcuate support, each roller of the second plurality of rollers being rotatable about a rotational axis belonging to a plane substantially parallel to a tangential plane to a profile of the second arcuate support at said predetermined position, wherein the rotational axis of each roller of said second plurality of rollers is inclined with respect to the radial or transversal plane of said second arcuate support with an opposite inclination of the rotational axis of an adjacent roller.

13. The massage device according to claim 12, wherein each roller of said second plurality of rollers comprises a plurality of pins made of a flexible material positioned on an outer surface thereof.

14. The massage device according to claim 12, wherein each roller of said second plurality of rollers comprises a plurality of grooves formed on an outer surface thereof.

15. The massage device according to claim 11, wherein said second arcuate support comprises a handle.

16. The massage device according to claim 11, wherein a pair of adjacent rollers on the second arcuate support have rotational axes which are positioned at a predetermined angle with respect to each other, such that skin and/or tissue being massaged is pinched therebetween the pair of adjacent rollers during movement of the massage device in a first direction.

17. The massage device according to claim 11, wherein a pair of adjacent rollers on the second arcuate support have rotational axes which are positioned at a predetermined angle with respect to each other, such that skin and/or tissue being massaged is stretched therebetween the pair of adjacent rollers during movement of the massage device in a first direction.

18. The massage device according to claim 11, wherein a pair of adjacent rollers on the second arcuate support have rotational axes which are positioned at a predetermined angle with respect to each other, such that skin and/or tissue being massaged is pinched therebetween the pair of adjacent rollers during movement of the massage device in a first direction, and such that the skin and/or tissue being massaged is stretched therebetween the pair of adjacent rollers during movement of the massage device in an opposing second direction.

* * * * *